Dec. 8, 1964  A. P. WATERSON  3,159,929
LAND LEVELER
Filed April 23, 1963  2 Sheets-Sheet 1
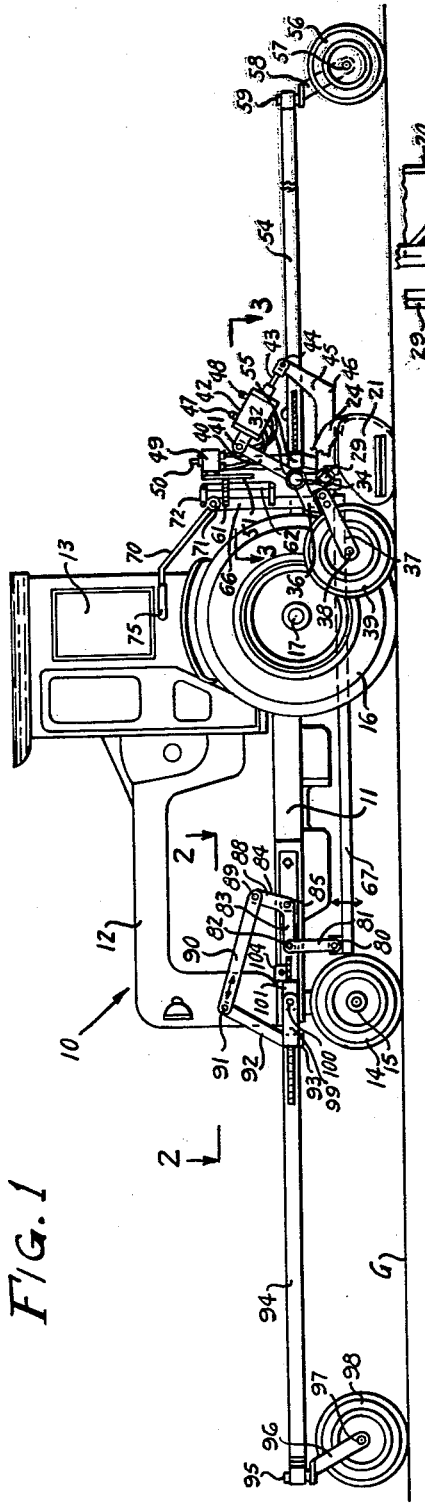
FIG. 1
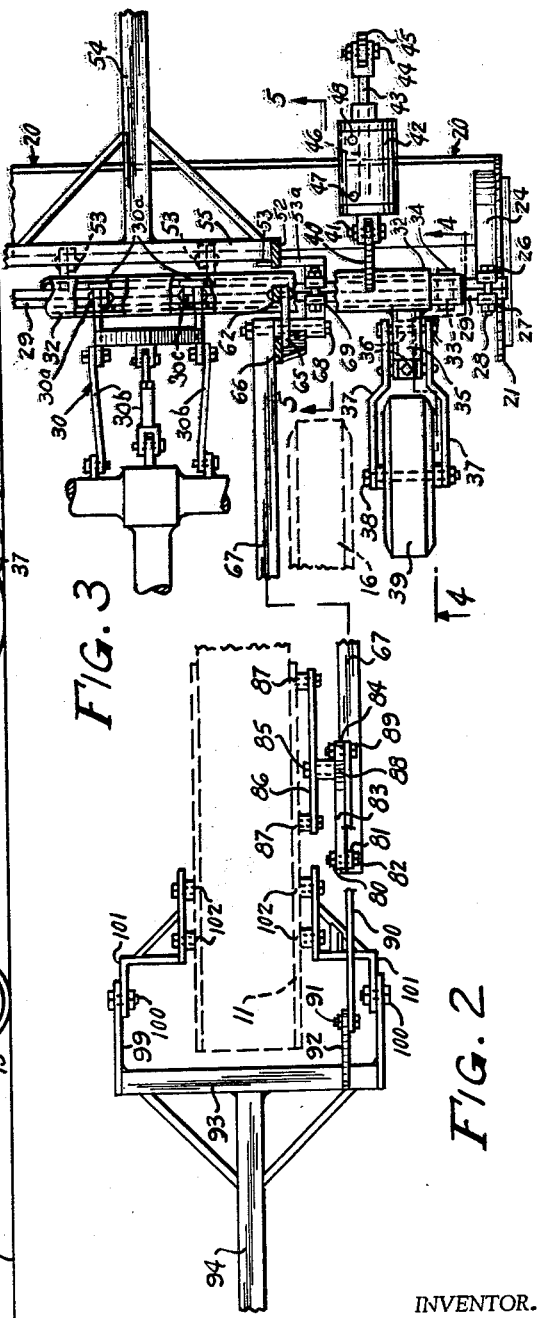
FIG. 3
FIG. 2
INVENTOR.
ARTHUR P. WATERSON
BY Kimmel & Crowell
ATTORNEYS.

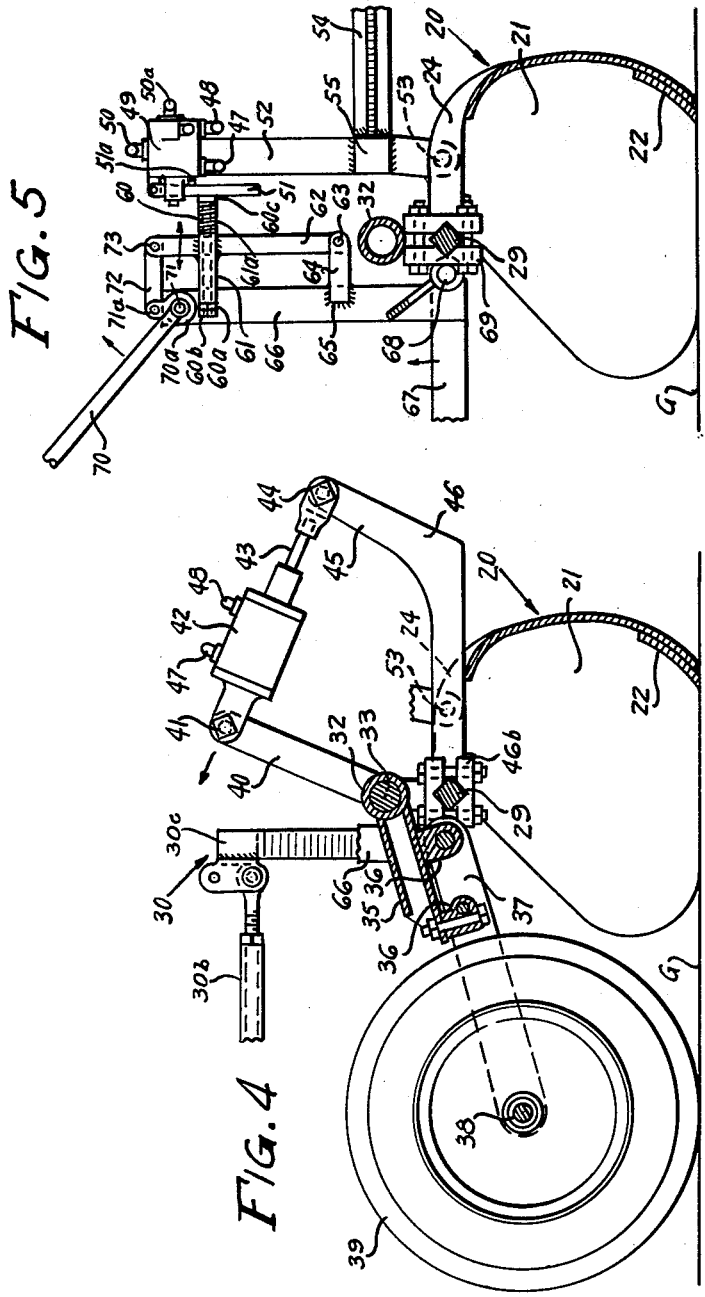

3,159,929
LAND LEVELER
Arthur P. Waterson, Box 415, Dighton, Kans.
Filed Apr. 23, 1963, Ser. No. 275,138
2 Claims. (Cl. 37—180)

This invention relates to a land leveler and has as its primary object the provision of an improved tractor mounted scraper blade and automatically actuated means for varying the height of the blade in accordance with the contour of the ground and constitutes an improvement over my prior patents entitled "Land Leveler," No. 3,034,239, dated May 15, 1962, and No. 3,103,098, dated September 10, 1963.

An additional object of the invention is the provision of a device of this character including automatically adjustable scraper blade which is raised or lowered in accordance with the contour of the ground over which the device is traveling and which, in contrast to my prior land leveler device, is raised or lowered by means of guide wheels in front of and at opposite ends of the blade rather than carried by the rear wheels of the tractor on which it was mounted.

A further object of this invention is the provision of improved means for raising and lowering a scraper by rotation of a lifting roll carried by its guide wheels relative thereto about an axis which is pivotally mounted relative to the scraper.

Still another object of the invention resides in the provision of means whereby movement of the scraper blade may be controlled by the movement of a forwardly extending feeler wheel independently of upward or downward movement of the front wheels of the tractor.

Still another object is the provision of an improved linkage for achieving the immediately foregoing objective.

A further object of the invention resides in the provision of an improved hydraulic control means for controlling the guide wheels relative to the scraper to raise or lower the same in accordance with the ground contour.

Still another object of the invention resides in the improved manual control means for varying the depth of cut to which the scraper blade is raised or lowered by the feeler elements.

Still other objects reside in the combination of elements, arrangements of parts and features of construction, all as will be more fully pointed out hereinafter and disclosed in the accompanying drawings wherein there are shown preferred embodiments of this inventive concept.

In the drawings:

FIGURE 1 is a side elevational view of one form of land leveler constructed in accordance with the instant invention, shown as attached to a conventional tractor with parts broken away for illustrative clarity;

FIGURE 2 is a fragmentary enlarged top plan view taken substantially along the line 2—2 of FIG. 1, as viewed in the direction indicated by the arrows, the tractor frame being indicated in dotted lines;

FIGURE 3 is an enlarged fragmentary sectional view, with parts thereof being broken away, taken substantially along the line 3—3 of FIG. 1, as viewed in the direction indicated by the arrows;

FIGURE 4 is an enlarged fragmentary detailed sectional view taken substantially along the line 4—4 of FIG. 3, as indicated by the arrows, with parts broken away for illustrative clarity; and FIGURE 5 is an enlarged fragmentary sectional view, taken substantially along the line 5—5 of FIG. 3, as viewed in the direction of the arrow.

Similar reference characters refer to similar parts throughout the several views of the drawings.

Having reference now to the drawing in detail, there is generally indicated at 10 a conventional tractor of any desired type which includes a frame 11, motor housing 12, with a control station 13 for the operator. The tractor is provided with steerable front wheels 14 mounted on an axle 15 and rear drive wheels 16 mounted on an axle 17 in a conventional manner.

The device of the instant invention is comprised of an elongated transverse scraper 20 which is provided with end plates 21 and a cutting edge 22. Support bars 24 fixedly secured to the scraper are in turn secured to clamping plates 26 which are held by means of opposed clamping plates 27 and bolts 28 in rigid related assembly with a transverse shaft 29. The shaft 29 is rigidly secured as by clamps 30a or welding to an attacher 30c which carries a conventional three-point hitch 30 which is pivotally connected by links 30b to the tractor frame at the rear thereof so that the blade may be raised or lowered relative to the contour of the ground in a manner to be more fully described hereinafter. A heavy steel tubular lifting roll or sleeve 32 has stubs 33 welded in each end supported on totally enclosed bearings 34 fixed to the shaft 29 for rotation of the lifting roll or sleeve 32 and carries at each end a forwardly extending, downwardly inclined support 35 from which depend fixed lugs 36 to the opposite sides of which are fixedly bolted bracket arms 37 which support axles 38, which in turn, carry oppositely disposed guide wheels 39, the arrangement being such that rotation of the lifting roll 32 raises or lowers the guide wheels 39 relative to the scraper blade 22, and consequently, varies the effective level of the scraper blade with respect to the ground level G.

An angularly disposed upwardly extending arm 40 is suitably affixed as by welding to lifting roll 32 and is pivotally connected as by means of pivot 41 to one end of a hydraulic cylinder 42. The cylinder 42 contains a conventional piston which is connected to a piston rod 43 which is in turn pivotally connected as by a pivot 44 to the upwardly extending portion 45 of a rearwardly extending L-shaped bracket 46 which is in turn fixedly secured to shaft 29. Fluid is supplied to cylinder 42 through conventional fluid conduits 47 and 48 which are controlled by conventional hydraulic valve 49 which is supplied with fluid through a fluid conduit 50 with a return fluid conduit 50a to any suitable conventional source (not shown). Valve 49 has valve control lever 51 (see FIG. 5) which selectively directs fluid through line 47 or 48 to move piston rod 43 and through arm 40 to rotate lifting roll 32 and vary the relative position of guide wheels 39 with respect to scraper 20 and accordingly, raise or lower cutting edge 22.

The valve 49 is mounted on rear upright 52 which is pivotally mounted on a pivot 53 carried by an arm 53a secured to shaft 29. A rearwardly extending feeler element 54 of any desired length is fixedly secured to a plate 55 which is fixed to and movable with the rear upright 52. Feeler element 54 carries a rear feeler wheel 56 carried on an axle 57 which is supported by a bracket 58 which is weldably mounted to pivot 59 carried by the rear of element 54. The operating lever of control means 51 of valve 49 engages the stop 60, to be more fully described hereinafter.

The stop 60 is operatively connected to a third upright 62, a matter now to be described, so that the height of the blade is governed by the conjoint action of the front and rear feeler elements. Stip 60 is mounted adjustably in a smooth sleeve 61, the adjustment being effected by rotating lock nuts 60a and 60b on a threaded rear portion of the stop 60. A spring 61a presses against head 60c on the stop 60 to bias the same into engagement with the lever 51. The lock nuts 60a and 60b allow a safety factor for valve 49 in case the tractor is operated without pressure to the valve 49. This occurs if the operator turns off the pressure while the wheels leave the leveled field at the turning area or at a corner which may be either below or above grade. The sleeve is mounted on the third upright 62 which is pivoted as at 63 to a lug 64, the lug being secured at 65 to the front upright 66 which is fixed to a longitudinally extending forward valve control member 67 which in turn is pivoted as at 68 to a support carried at 69 by the shaft 29. The arrangement is thus such that when forward control member 67 is rotated about the pivot 68 in a manner to be described more fully hereinafter, the stop 60 moves toward and away from the valve control means 51 rather than, as previously described, the valve control means moving toward and away from a stop. A spring 51a carried by the valve housing 49 biases valve control lever normally toward engagement with stop 60.

Manual control means are provided for varying the position of stop 60 and hence control lever 51 independently of either rear feeler element 54 or front feeler element 94 and takes the form of manual control handle 70 which is pivotally secured as at 71 to the top of front upright 66 and which, through a link 72, serves to move the upper end of the third upright 62 to which it is pivoted by means of a pivot 73 so that the valve control lever 51 may control the valve 49 to move the scraper in accordance with the operator. Suitable friction means such as pressure plate 70a pivoted at 71 and 71a serve to retain manual control handle 70 in any desired adjusted position. As best shown in FIG. 1, the upper end of control 70 is provided with a handle 75 adjacent the operator's station.

The forward end of forward control member 67 is pivoted by a pivot 80 to a depending link 81 which is pivoted at its other end 82 to a normally horizontal arm 83 of a bellcrank lever 84 which is pivoted on the pivot 85 to a plate 86 supported by bolts and spacers 87 on the side of frame 11 of the tractor. A normally upright arm 88 of bellcrank member 84 is pivoted as by a pivot 89 to a link 90. The other end of link 90 is in turn pivoted as by a pivot 91 to an inclined arm 92 which is fixed to a crossbar 93 which is secured to the end of the front feeler element 94. The front feeler element 94 carries a swivel 95 which supports the bracket 96 which carries an axle 97 upon which is mounted a front feeler wheel 98. Transverse bar 93, in turn, has rearwardly extending end pieces 99 which are pivoted as by means of pivots 100 to offset bracket arms 101 which are, in turn, secured as by bolts and spacers 102 to the sides of frame 11 adjacent the forward end thereof.

The arrangement is such that the forward feeler wheel 98, upon encountering an irregularity in the ground G, for example, a raised portion, will pivot the front feeler element 94 upwardly on its pivot 100 which in turn rotates the inclined arm 92 in a clockwise direction as seen in FIGURE 1, the inclined arm 92 pushing the link 90 to the right in the direction of the double-headed arrow which in turn rotates the bell crank 84 clockwise about the pivot means 85 thereby rotating the normally horizontal arm 83 of the bell crank which lifts the depending link 81 to raise the front end of the forward control member 67 and thereby tilt the front upright 66 clockwise as seen in FIGURE 5 about the pivot 68 so that the stop 60 is moved toward the valve control means 51 biasing the same against the pressure of the spring 51a to actuate the hydraulic valve 49 for feeding fluid pressure through the flexible conduit 47 to the hydraulic cylinder 42 thereby extending the piston rod 43 which rotates the lifting roll 32 and since the guide wheels 39 are carrying the weight of the scraper 20, this above-mentioned action raises the scraper 20 upwardly to correct the deviation caused by the front feeler wheel 98 traveling onto higher elevation. Similarly, a lowering of the front feeler wheel 98 will operate through the above-described linkage to actuate the hydraulic cylinder 42 to retract the piston rod 43 and thereby lower the scraper 20.

It will also be clear now that the bell crank 84 and other linkage forming part of the front feeler acts to compensate for any movement up or down of the tractor front wheels 14 so that the position of the scraper 20 is only controlled by the relationship of the front and rear feeler wheels 98 and 56, respectively. For example, if the front wheels 14 were raised by encountering an irregularity in the ground G, the rear portion of the front feeler element 94 would be raised accordingly since the pivot 100 is secured to the tractor frame 11. This would in turn raise the inclined arm 92 which is carried by the pivot 100. The bell crank 84 would also be raised since its pivot 85 is secured to the tractor frame 11. The link 90 would be moved upwardly parallel to its original position in view of the raising of both pivots 100 and 85 to rotate the bell crank 84 in a counterclockwise direction as seen in FIGURE 1 about its pivot 85, the end of its normally horizontally extending arm 83 remaining stationary. Since the pivot 82 is not raised or lowered by this action, the depending link 81 is not affected and the forward control member 67 remains stationary so that the front upright 66 and the third upright 62 do not move to actuate the hydraulic valve 49. If, however, at any time during the offset position of the front wheels 14, the forward feeler wheel 98 encounters an irregularity, it will operate as explained hereinabove to actuate the hydraulic valve 49 and thereby move the scraper 20.

Engagement of the rear feeler wheel 56 with an irregularity, such as a raised portion, will pivot the rear feeler element 54 about its pivot means 53 to tilt the rear upright 52 forwardly thereby moving the valve control means 51 of the hydraulic valve 49 into engagement with the stop 60 to feed fluid through the conduit 47 thereby raising the scraper in the same manner as explained hereinbefore on raising of the front feeler wheel 98. Thus, the position of the scraper 20 is actually determined by an average of the positions of the two feeler elements. This will ensure an accurate leveling of the ground surface over a large area.

By positioning a guide wheel 39 in front, and adjacent both ends, of the transverse scraper 20 and the earth which it is carrying or pushing, parallel action of the scraper blade 22 relative to the ground G is ensured. These guide wheels 39 actually carry the weight of the transverse scraper 20 while maintaining alignment of the scraper 20 with the feeler wheels 98 and 56. Moreover, the positioning of the guide wheels forwardly of the load of earth carried by the scraper 20 and near the tractor's drive wheels 16 facilitates in steering the tractor, while simultaneously maintaining the parallel relationship between the scraper blade 22 and the ground G since each guide wheel 39 carries its end of the transverse scraper 20.

From the foregoing it will now be seen there is herein provided an improved land leveler which accomplishes all the objects of this invention, and others, including many advantages of very practical utility and commercial importance.

As many embodiments may be made of this inventive concept and as many modifications may be made in the embodiments hereinafter shown and described, it is to be understood that all matter herein is to be interpreted merely as illustrative and not in a limiting sense.

I claim:

1. In combination with a tractor including a frame and front and rear wheels, a land leveler comprising a transverse scraper pivotally mounted at the rear of the tractor and having a cutting edge for cutting earth over which the tractor travels, a shaft carried by said scraper, a lifting roll rotatably carried by said shaft, downwardly inclined supports carried by said lifting roll, guide wheels carried by said supports, an upwardly extending arm carried by said lifting roll, a rearwardly and upwardly extending bracket carried by said shaft, a hydraulic cylinder including a piston and a piston rod connected between said said arm and said bracket, a rear upright pivotally carried by said shaft, a front upright aligned with said rear upright and pivotally carried by said shaft, a hydraulic valve carried by one of said front and rear uprights, a pair of fluid conduit means operatively connecting said hydraulic valve to opposite ends of said hydraulic cylinder, a valve control level selectively directing fluid from said hydraulic valve through one of said fluid conduit means to extend and retract the piston rod of said hydraulic cylinder and thereby vary the relative position of said scraper with respect to said guide wheels, stop means carried by the other of said front and rear uprights and operatively engaging said valve control lever, a rearwardly extending feeler element, including a rear wheel in contact with the ground, fixed to said rear upright, a forwardly extending feeler element, including a front wheel in contact with the ground, fixed to said front upright, movement of either of said feeler elements upwardly or downwardly pivoting its associated upright to move said valve control lever and selectively direct fluid from said hydraulic valve to one of said fluid conduit means to actuate said hydraulic cylinder and thereby rotate said lifting roll to vary the relationship of said scraper with respect to said guide wheels, said forwardly extending feeler element including a forwardly extending control member fixed to said front upright, a bell crank lever pivoted to the tractor frame and having a normally horizontal arm and a normally upright arm, a depending link pivotally interconnected between the forward end of the control member and said normally horizontal arm, a link pivotally connected at one end to said normally upright arm, an upwardly inclined arm pivotally connected at one end to the other end of said last-mentioned link, and a front feeler element carrying said front wheel, said front feeler element being fixed to the other end of said inclined arm and pivotally carried by the frame to the tractor for vertical articulation only.

2. In combination with a tractor including a frame and front and rear wheels, a land leveler comprising a transverse scraper pivotally mounted at the rear of the tractor and having a cutting edge for cutting earth over which the tractor travels, a shaft carried by said scraper, a lifting roll rotatably carried by said shaft, downwardly inclined supports carried by said lifting roll, guide wheels carried by said supports, one of said supports being inclined downwardly and forwardly at each end of said lifting roll, said guide wheels being carried by said supports adjacent each end of said scraper and spaced immediately in front of said scraper and the earth being pushed by the same, an upwardly extending arm carried by said lifting roll, a rearwardly and upwardly extending bracket carried by said shaft, a hydraulic cylinder including a piston and a piston rod connected between said arm and said bracket, a rear upright pivotally carried by said shaft, a front upright aligned with said rear upright and pivotally carried by said shaft, a hydraulic valve carried by one of said front and rear uprights, a pair of fluid conduit means operatively connecting said hydraulic valve to opposite ends of said hydraulic cylinder, a valve control lever selectively directing fluid from said hydraulic valve through one of said fluid conduit means to extend and retract the piston rod of said hydraulic cylinder and thereby vary the relative position of said scraper with respect to said guide wheels, stop means carried by the other of said front and rear uprights and operatively engaging said valve control lever, a rearwardly extending feeler element, including a rear wheel in contact with the ground, fixed to said rear upright, a forwardly extending feeler element, including a front wheel in contact with the ground, fixed to said front upright, movement of either of said feeler elements upwardly or downwardly pivoting its associated upright to move said valve control lever and selectively direct fluid from said hydraulic valve to one of said fluid conduit means to actuate said hydraulic cylinder and thereby rotate said lifting roll to vary the relationship of said scraper with respect to said guide wheels, said forwardly extending feeler element including a forwardly extending control member fixed to said front upright, a bell crank lever pivoted to the tractor frame and having a normally horizontal arm and a normally upright arm, a depending link pivotally interconnected between the forward end of the control member and said normally horizontal arm, a link pivotally connected at one end to said normally upright arm, an upwardly inclined arm pivotally connected at one end to the other end of said last-mentioned link, and a front feeler element carrying said front wheel, said front feeler element being fixed to the other end of said inclined arm and pivotally carried by the frame of the tractor for vertical articulation only.

References Cited in the file of this patent

UNITED STATES PATENTS 2,792,651   Hobday  ---------------- May 21, 1957
3,034,239   Waterson ---------------- May 15, 1962